(12) United States Patent
Chen et al.

(10) Patent No.: US 9,443,133 B2
(45) Date of Patent: Sep. 13, 2016

(54) ELECTRONIC DEVICE HAVING MESSAGE-RECORDING AND MESSAGE-PLAYBACK FUNCTION AND RELATED METHOD

(71) Applicant: HON HAI PRECISION INDUSTRY CO., LTD., New Taipei (TW)

(72) Inventors: Mei-Ju Chen, New Taipei (TW); Han-Fang Tu, New Taipei (TW); Kuan-Jung Chiu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 179 days.

(21) Appl. No.: 14/228,764

(22) Filed: Mar. 28, 2014

(65) Prior Publication Data

US 2014/0294358 A1 Oct. 2, 2014

(30) Foreign Application Priority Data

Apr. 2, 2013 (TW) .............................. 102111983 A

(51) Int. Cl.
| | |
|---|---|
| *H04N 21/44* | (2011.01) |
| *G06K 9/00* | (2006.01) |
| *H04N 21/422* | (2011.01) |
| *H04N 21/442* | (2011.01) |
| *H04N 21/4788* | (2011.01) |
| *H04N 21/488* | (2011.01) |

(52) U.S. Cl.
CPC .... *G06K 9/00288* (2013.01); *H04N 21/42201* (2013.01); *H04N 21/42209* (2013.01); *H04N 21/44218* (2013.01); *H04N 21/4788* (2013.01); *H04N 21/4882* (2013.01)

(58) Field of Classification Search
None
See application file for complete search history.

(56) References Cited

U.S. PATENT DOCUMENTS

| | | | | |
|---|---|---|---|---|
| 2009/0262914 | A1* | 10/2009 | Khouri ................... | H04M 3/42 379/202.01 |
| 2009/0315713 | A1* | 12/2009 | Gao ....................... | G08B 21/24 340/551 |
| 2014/0015967 | A1* | 1/2014 | Moore ............... | H04N 5/23219 348/143 |
| 2015/0264439 | A1* | 9/2015 | Karlin .............. | H04N 21/42202 725/12 |

FOREIGN PATENT DOCUMENTS

TW 201005551 A 2/2010

* cited by examiner

*Primary Examiner* — Eileen Adams
(74) *Attorney, Agent, or Firm* — Zhigang Ma

(57) ABSTRACT

A method for completing message-playback on an electronic device involves: detection of an unplayed message storage, determining the facial images of the message recipients associated with the unplayed message, capturing facial images of members in front of the electronic device, comparing the facial images associated with the unplayed message with the captured facial image, determining whether there is at least one member who has not received this message who is in front of the electronic device according to the comparison, and if so playing the message.

16 Claims, 4 Drawing Sheets

ELECTRONIC DEVICE HAVING MESSAGE-RECORDING AND MESSAGE-PLAYBACK FUNCTION AND RELATED METHOD

FIELD

The present disclosure relates to communication systems, and particularly to an electronic device having message-recording and message-playback function and a method of using same.

BACKGROUND

When a first household member wants to leave information for a second member, the first member may leave a written hardcopy message. Electronic devices such as smart televisions, computers, and tablets are popular now and the options for leaving messages ought to be increased.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
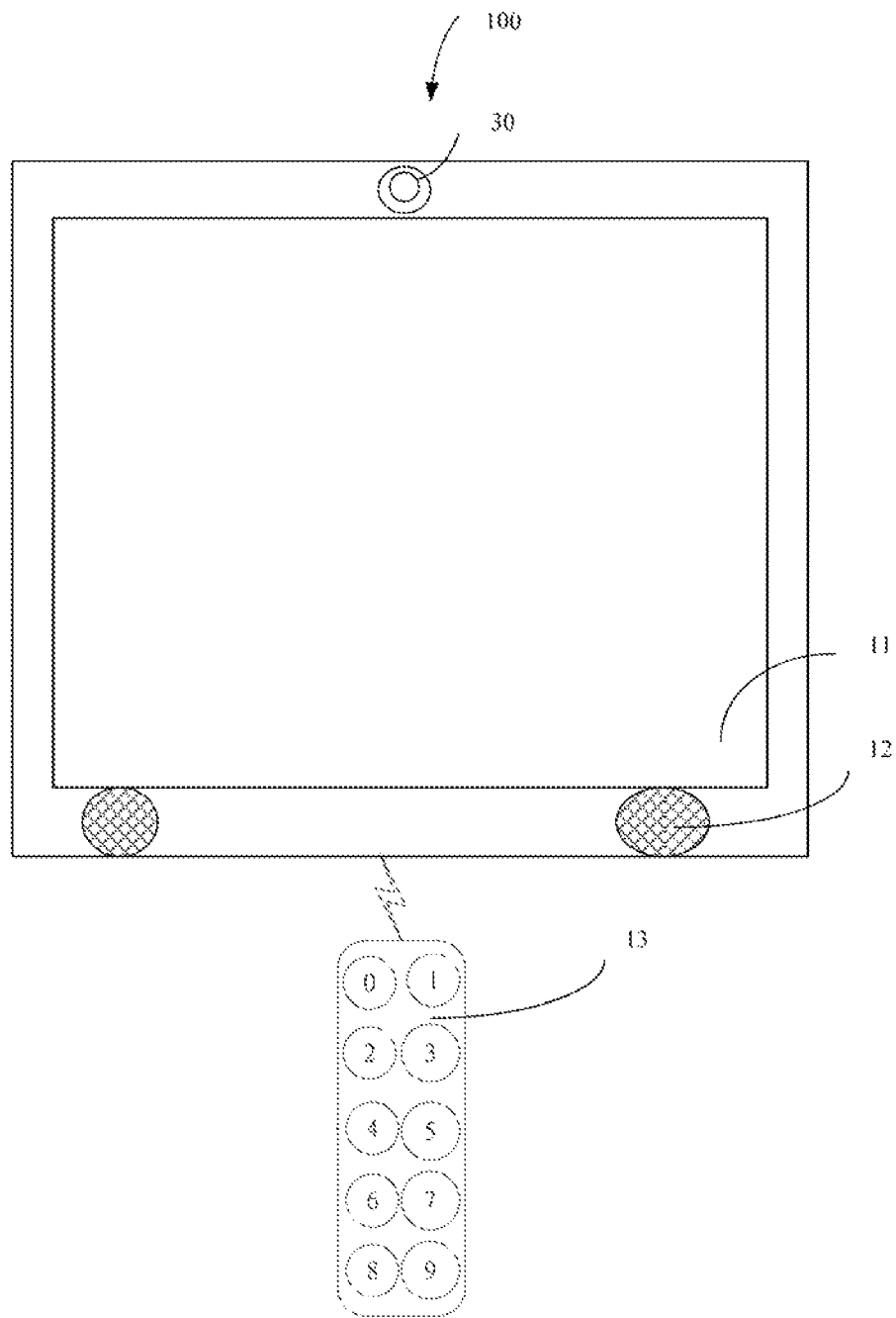
FIG. 1 is a schematic view of an embodiment of an electronic device.
Figure 2:
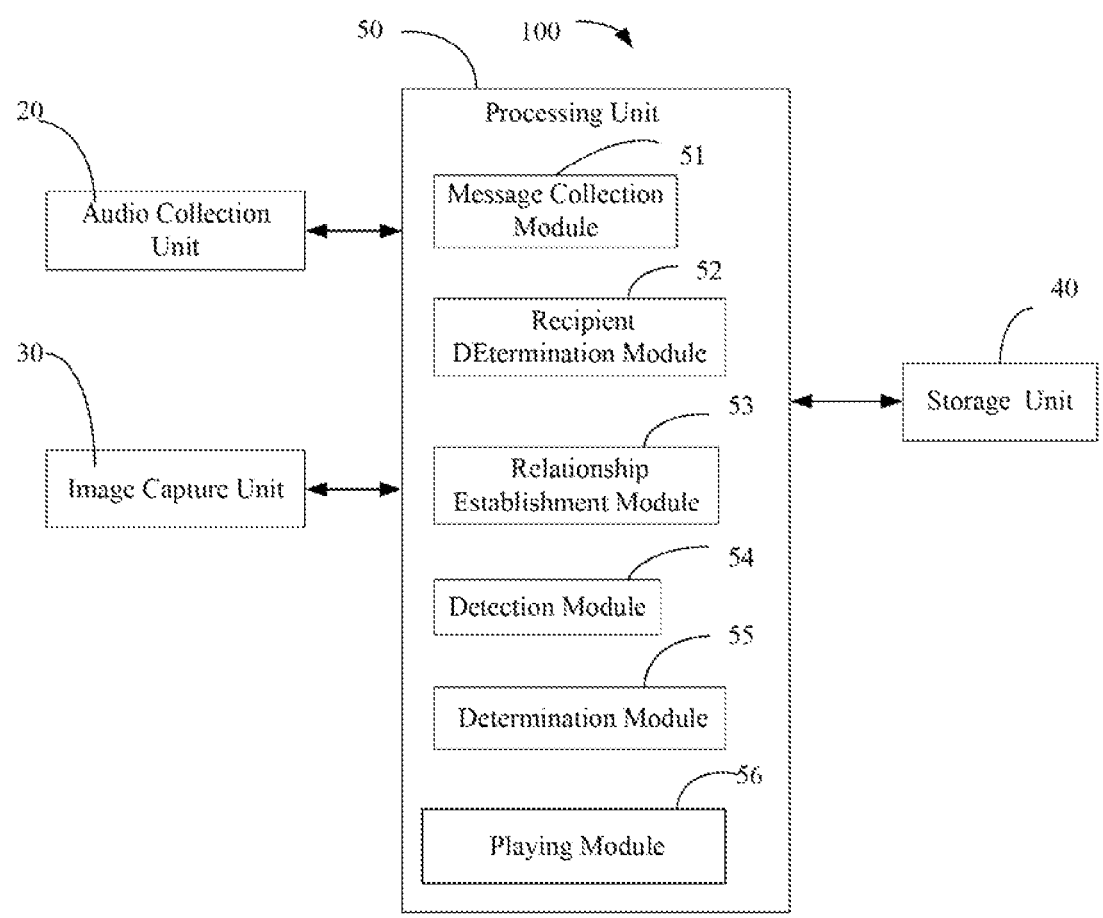
FIG. 2 is a block diagram of the electronic device of FIG. 1.

FIGS. 1-2 show an electronic device 100 having message-recording and playback function. The electronic device 100 can include an audio collection unit 20, an image capture unit 30, a storage unit 40 and a processing unit 50. The electronic device 100 can further include a display unit 11, a voice output unit 12, and an input unit 13. In at least one embodiment, the electronic device 100 is a smart TV belonging to a household. (See FIG. 1). The input unit 13 can be mechanical keys on the electronic device 100 or keys of a remote controller of the electronic device 100.

The storage unit 40 stores a number of facial images of users of the electronic device 100. In at least one embodiment, the user is a member of a household having the electronic device 100, such as the members of a family or friends living together (an individual belonging to any such group being referred to hereafter as "member").

The processing unit 50 includes a message collection module 51, a recipient determination module 52, and a relationship establishment module 53.

The message collection module 51 collects one or more messages left by a member in response to an input signal from the member. In at least one embodiment, the member can leave one or more messages via the audio collection unit 20 or/and the image capture unit 30. The message collection module 51 also stores the collected messages in the storage unit 40. In at least one embodiment, the message can be audio, video, or a message containing both audio and images.

The message recipient determination module 52 determines message recipients of each of the collected messages according to user information inputted by the member. In at least one embodiment, one message can have one or more message recipients. When one message has multiple recipients, and when one of the message recipients receives the message, the message is marked as a played message corresponding to that recipient; when one of the message recipients has not received the message recipient, the message is marked as an unplayed message corresponding to the uninformed recipient; only when all of the message recipients have received the message the message is marked as a fully played message. The user information includes a member name associating with a facial image of the member or a member's facial image or both. For example, before or after a message is collected, the display unit 11 displays names or associated facial images of members or both.

The relationship establishment module 53 establishes a relationship list recording relationships between the messages collected by the message collection module 51 and facial images of the message recipients as determined by the message recipient determination module 52. The relationship establishment module 53 further stores the established relationship list in the storage unit 40.

The processing unit 50 further includes a detection module 54, a determination module 55, and a playing module 56.

The detection module 54 detects whether there is an unplayed message existing in the storage unit 40. In at least one embodiment, the detection module 54 is configured to detect whether there is an unplayed message existing in the storage unit 40 after the electronic device 100 has completed the initiation of the system of the electronic device 100. If there is such a message, the detection module 51 determines the facial images of the one or more particular message recipients associated with the unplayed message according to the relationship list, and further controls the image capture unit 30 to capture facial images of members in front of the electronic device 100. In at least one embodiment, the detection module 54 controls the image capture unit 30 to capture the facial images of members or other users at predefined time intervals such as 10 minutes or 15 minutes, until the image capture unit 30 has captured at least one facial image of all members.

In at least one embodiment, the determination module 55 compares the facial images associated with the unplayed message with the facial images captured by the image capture unit 30, and determines whether at least one member who has not received the unplayed message so far is in front of the electronic device 100. If yes, the playing module 56 plays the unplayed message. After the unplayed message has been played, the playing module 56 further generates a mark to mark the message as a played message corresponding to that member. In the embodiment, the playing module 56 decodes the message into audio and image data as required, which can be reproduced by the electronic device 100 through the voice output unit 12 and a display unit 11.

Figure 3:
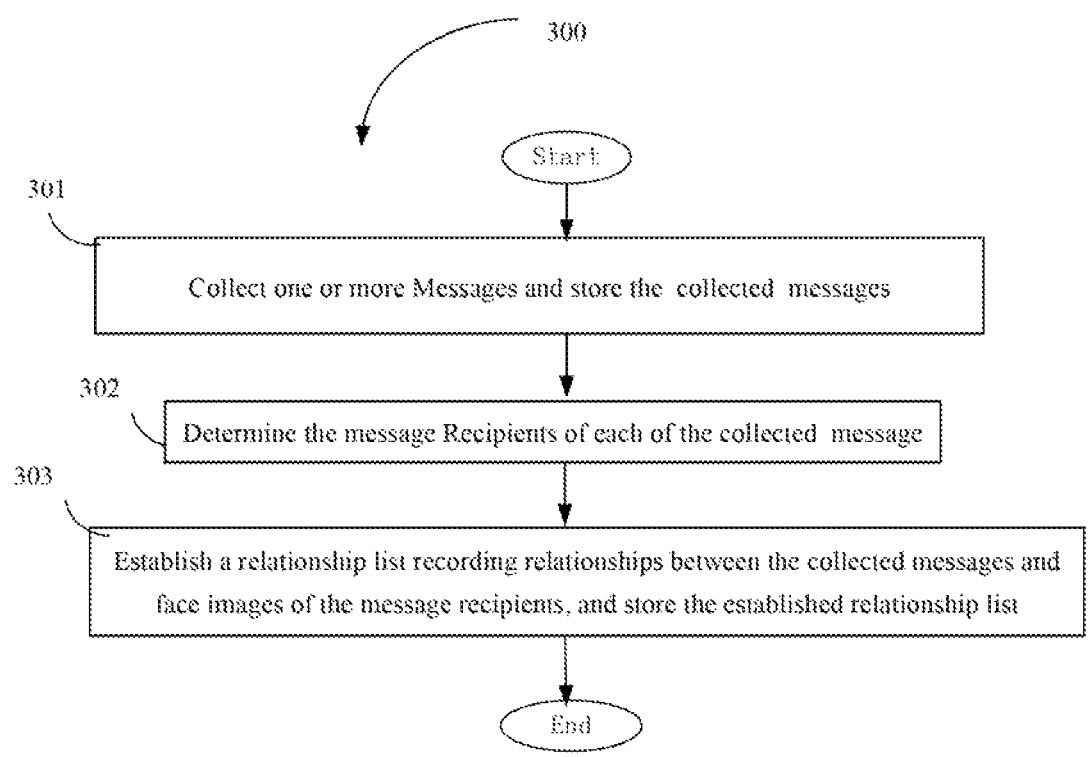
FIG. 3 is a flowchart of a method for electronic devices, such as the one of FIG. 1, showing a flow of the process for recording message, in accordance to an exemplary embodiment.

FIG. 3 shows a process flowchart of a method 300 for recording messages. The method is applied to the electronic device 100. The electronic device 100 includes an audio collection unit 20, an image capture unit 30, a storage unit 40, and a processing unit 50. The storage unit 40 stores a number of facial images of users of the electronic device 100. The electronic device 100 includes a display unit 11, a voice output unit 12, and an input unit 13. The method 300 includes blocks, each of which is related to the various components contained in the electronic device 100.

In 301, the message collection module 51 collects one or more messages left by a member in response to the member's input signal. In the embodiment, the member can leave one or more messages via the audio collection unit 20 or/and the image capture unit 30. The message collection module 51 further stores the collected messages in the storage unit 40.

In 302, the message recipient determination module 52 determines message recipients of each of the collected message according to user information inputted by the member. One message can have one or more message recipients. The user information includes a member name associating with a facial image of the member or/and a member's facial image.

In 303, the relationship establishment module 53 establishes a relationship list recording relationships between the messages collected by the message collection module 51 and facial images of the message recipients as determined by the message recipient determination module 52. The relationship establishment module 53 further stores the established relationship list in the storage unit 40. Within this disclosure, method 300 can be combined with other methods and steps.

Figure 4:
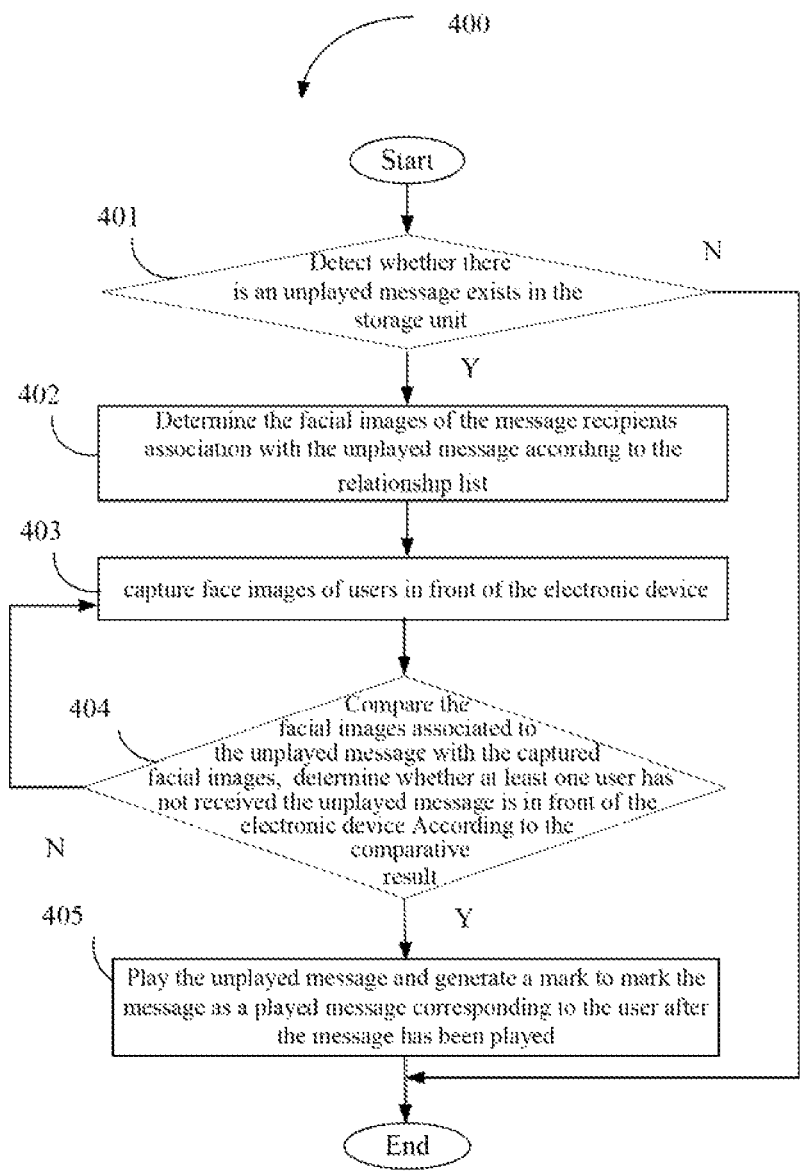
FIG. 4 is a flowchart of a method for electronic devices, such as the one of FIG. 1, showing a flow of the process for playing messages in accordance to an exemplary embodiment.

FIG. 4 shows a flowchart of a method 400 for playing messages. The method includes steps, each of which is related to the various components contained in the electronic device 100.

In 401, the detection module 54 detects whether there is an unplayed message existing in the storage unit 40; if yes, the process goes to 402, if no, the process ends.

In an embodiment, the detection module 54 detects whether there is an unplayed message existing in the storage unit 40 after the electronic device 100 has completed the initiation of the system of the electronic device 100.

In 402, the detection module 54 determines the facial images of the message recipients associated with the unplayed message according to the relationship list.

In 403, the detection module 54 controls the image capture unit 30 to capture facial images of members in front of the electronic device 100.

In at least one embodiment, the detection module 54 controls the image capture unit 30 to capture the facial images of members at predefined time intervals until the image capture unit 30 captures at least one facial image of all members.

In 404, the determination module 55 compares the facial images of the message recipient associated with the unplayed message with the facial images captured by the image capture unit 30, and determines whether at least one member who has not received the unplayed message so far is in front of the electronic device 100; if yes, the process goes to 405; if no, in an embodiment, the process goes to 403 to capture facial images of additional or subsequent members in front of the electronic device 100.

In 405, the playing module 56 plays the unplayed message and generates a mark to mark the messages as a played message corresponding to that member after the unplayed message has been played.

In the above described embodiment of method 400, the playing module 56 decodes the message into audio and image data as required. Within this disclosure, the steps of method 400 can be combined with other methods and steps.

The electronic device 100 provided by the present disclosure includes an audio collection 20, an image capture unit 30, a storage unit 40, and a processing unit 50. The storage unit 40 stores facial images of users of the electronic device 100. The electronic device 10 collects message via the audio collection unit 20 and/or image capture unit 30. The processing unit 50 determines message recipients of the message and establishes a relationship list recording relationships between the messages and the facial images of the intended recipients. The image capture unit 30 captures facial images of members in front of the electronic device 100 via the image capture unit 30. The processing unit 50 compares the facial image associated with an unplayed message with the captured facial images, and determines whether at least one member who has not yet received the unplayed message is in front of the electronic device 100. If yes, the processing unit 50 controls to play the message to the member. A method for completing the leaving of messages is also provided by the present disclosure.

Although the present disclosure has been described in detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. An electronic device having message-recording and message-playback function, comprising:
    an image capture unit;
    a storage unit storing a plurality of facial images of members and a relationship list recording relationships between messages left by members and facial images of message recipients of the messages;
    whereby the image capture unit captures the facial images of the members at predefined time intervals until the image capture unit captures at least one facial image of all members; and
    a processing unit to:
    a). detect whether there is an unplayed message existing in the storage unit,
    b). determine the facial images of the message recipients association with the unplayed message according to the relationship list when there is an unplayed message existing in the storage unit,
    c). control the image capture unit to capture facial images of members in front of the electronic device,
    d). compare the facial images associated with the unplayed message with the captured facial images of members, and determine whether at least one member who has not received the unplayed message is in front of the electronic device according to the comparative result; and
    e). play the unplayed message when at least one member who has not received the unplayed message is in front of the electronic device.

2. The electronic device as described in claim 1, wherein the electronic device initiates an operation system of the electronic device before the processor detects whether there is an unplayed message existing in the storage unit.

3. The electronic device as described in claim 1, wherein the message is audio, video or a message containing audio and images.

4. The electronic device as described in claim 3, wherein the electronic device comprises an audio collection unit, the member leaves one or more messages via the audio collection unit.

5. The electronic device as described in claim 4, wherein the member leaves one or more messages further via the image capture unit.

6. The electronic device as described in claim 4, wherein the electronic device comprises a voice output unit and a display unit, the processor decodes the message into audio or image data as required, the audio date is reproduced through the voice output unit and the image data is reproduced through the display unit.

7. The electronic device as described in claim 1, wherein the electronic device is a smart TV.

8. The electronic device as described in claim 1, wherein the processor generates a mark to mark the message as a played message corresponding to the member after the unplayed message has been played.

9. A method for completing message-playback on an electronic device, the electronic device comprising an image capture unit, a storage unit storing a plurality of facial images of members of the electronic device and a relationship list recording relationships between messages left by members and facial images of message recipients of the messages, whereby the image capture unit captures the facial images of members at predefined time intervals until the image capture unit captures at least one facial image of all members; the method comprising:
    detecting whether there is an unplayed message existing in the storage unit;
    determining the facial images of the message recipients association with the unplayed message according to the relationship list when there is an unplayed message existing in the storage unit;
    capturing facial images of members in front of the electronic device;
    comparing the facial images associated to the unplayed message with the captured facial images of members;
    determining whether at least one member who has not received the unplayed message is in front of the electronic device according to the comparative result; and
    playing the unplayed message when the at least one member who has not received the unplayed message is in front of the electronic device.

10. The method described as in claim 9, wherein the electronic device initiates an operating system of the electronic device before detecting whether there is an unplayed message existing in the storage unit.

11. The method described as in claim 9, wherein the message is an audio, a video and a message containing audio and images.

12. The method described as in claim 11, wherein the unplayed message is played by decoding the unplayed message into audio and image data, the audio data is reproduced through a voice output unit of the electronic device and the image data is reproduced through a display unit of the electronic device.

13. The method described as in claim 9, wherein the method further comprises:
    generating a mark to mark the message as a played message corresponding to the member after the unplayed message has been played.

14. A method for completing message-recording and message-playback on an electronic device, the electronic device comprising an audio collection unit, an image capture unit and a storage unit storing a plurality of facial images of members of the electronic device, whereby the image capture unit captures the facial images of the members at predefined time intervals until the image capture unit captures at least one facial image of all members; the method comprising:
    collecting a message via the audio collection unit or/and the image capture unit in response to a input signal of a member;
    determining message recipients of the collected message according to user information inputted by the member;
    establishing a relationship list recording relationships between the collected message and facial images of the message recipients;
    detecting whether there is an unplayed message existing in the storage unit;
    determining the facial images of the message recipients association with the unplayed message according to the relationship list when there is an unplayed message existing in the storage unit;
    capturing facial images of members in front of the electronic device;
    comparing the facial images associated to the unplayed message with the captured facial images of members;
    determining whether at least one member who has not received the unplayed message is in front of the electronic device according to the comparative result; and
    playing the unplayed message when at least one member who has not received the unplayed message is in front of the electronic device.

15. The method described as in claim 14, wherein the electronic device initiates an operation system of the electronic device before detecting whether there is an unplayed message existing in the storage unit.

16. The method described as in claim 14, wherein the method further comprises:
    generating a mark to mark the message as a played message corresponding to the member after the unplayed message has been played.

* * * * *